United States Patent Office 2,781,205
Patented Feb. 12, 1957

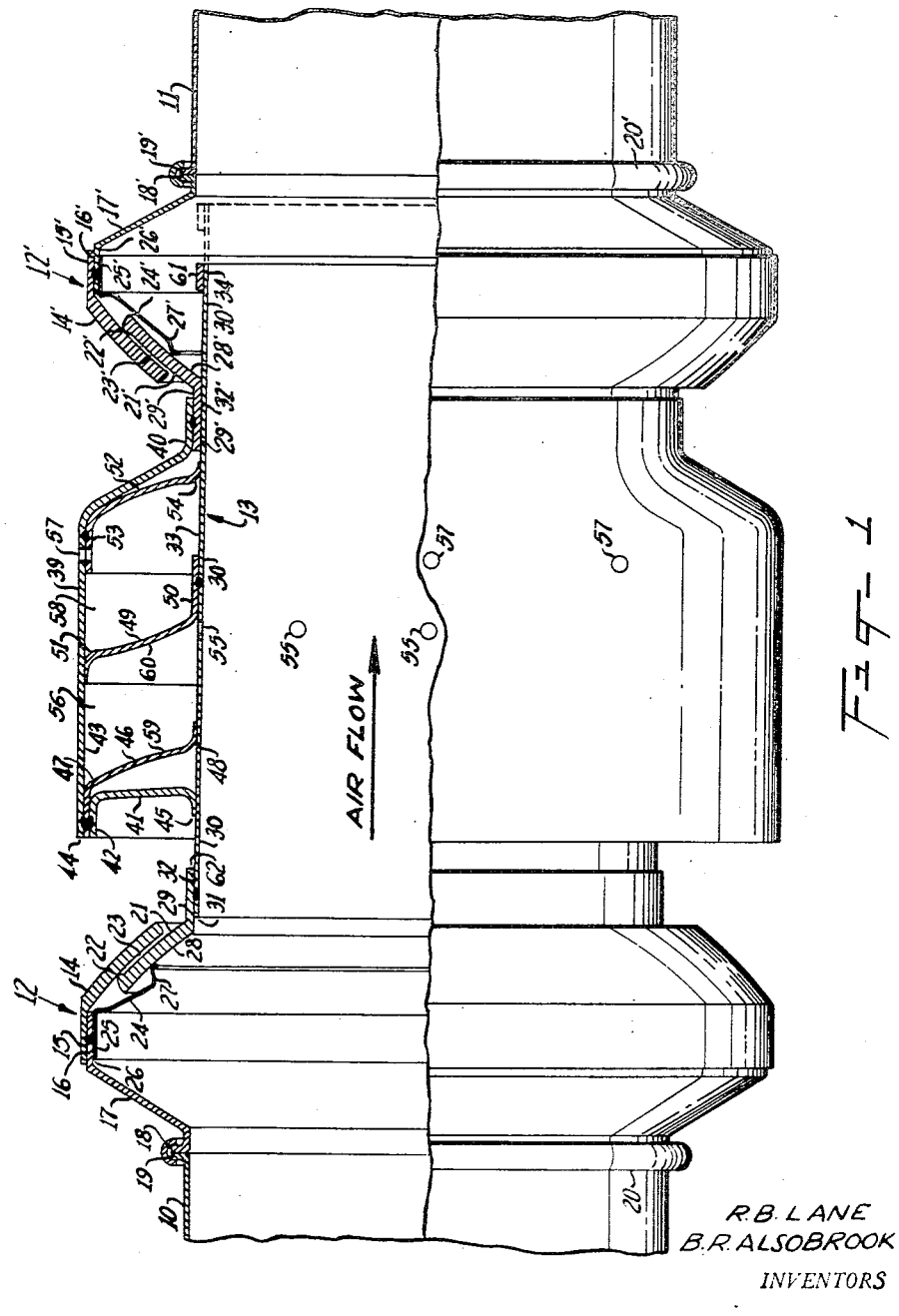

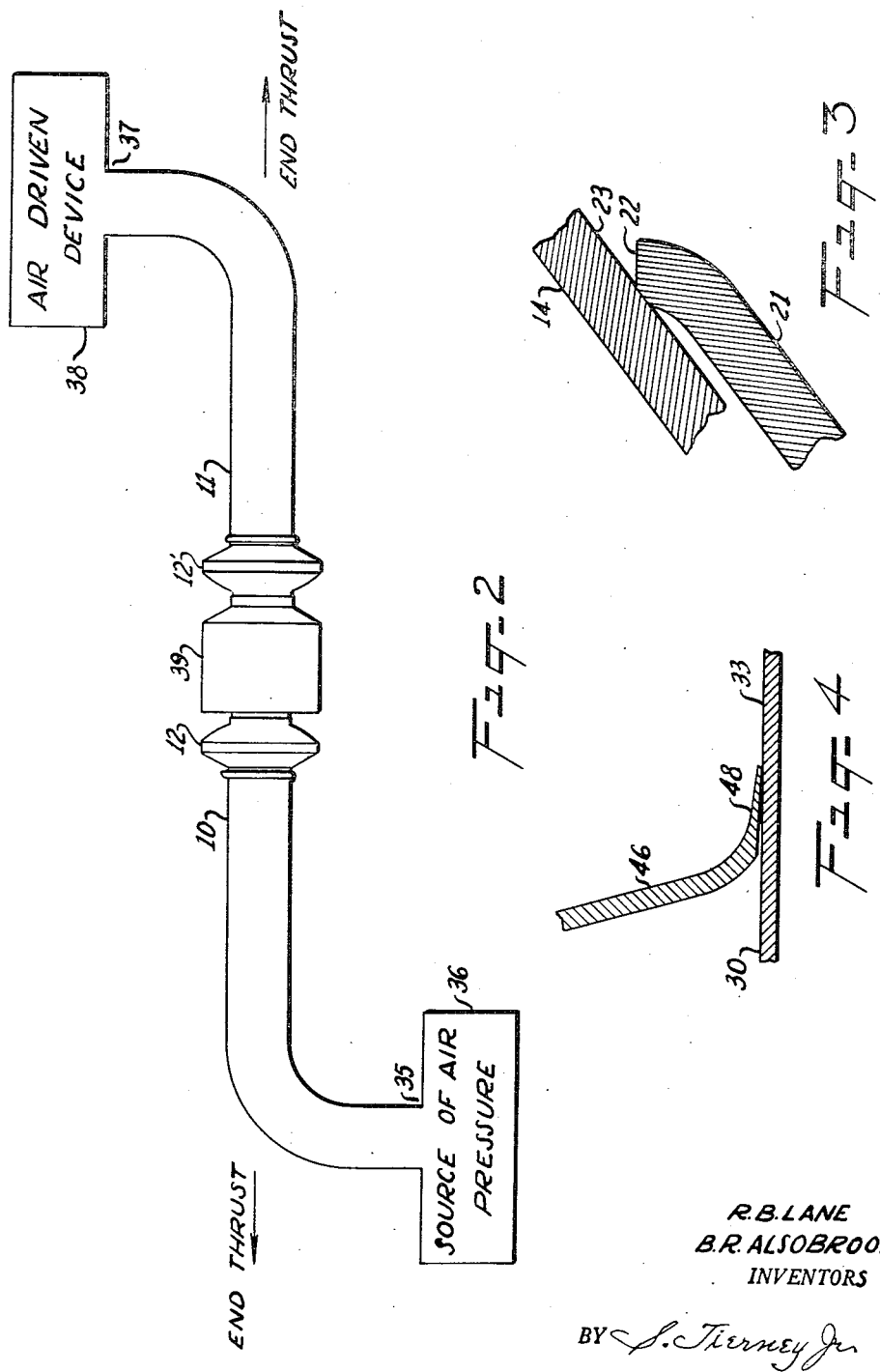

2,781,205

SEALED FLEXIBLE DUCT JOINT

Robert B. Lane, San Diego, and Benjamin R. Alsobrook, Chula Vista, Calif., assignors to Rohr Aircraft Corporation, Chula Vista, Calif., a corporation of California Application May 10, 1954, Serial No. 428,612

5 Claims. (Cl. 285—106)

This invention relates to a sealed flexible joint for connecting the adjoining ends of two tubes together to permit angular, lateral and axial displacement of the tube ends while maintaining a seal against leakage. It is particularly adapted for use between sections of tubing used to convey fluids under pressure.

In large airplanes powered by engines equipped with turbine driven air compressors it is customary to direct a portion of the air compressed by the compressors to various sections of the airplane to be used for heating and pressurizing cabins, operating de-icing equipment and other purposes. The tubing system used to convey the compressed air is necessarily extensive and complex and must be provided with flexible joints which permit endwise movement of the tubes due to thermal expansion and contraction and angular and lateral displacement of the tube ends due to the weaving and flexing of the airplane structure in flight. The thrust of the pressurized air against the inside of the tubes has a tendency, when two tubes are connected by a conventional slip joint, to force the tubes to move longitudinally away from each other. To limit this movement it has been necessary to provide suitable brackets or supports at intervals along the tubing system which are secured to the tubes and the structural members of the airplane. The use of such supports and brackets adds considerable undesirable weight to the aircraft and also frequently requires that the tubes be located in inconvenient positions where suitable sturctural members to which the brackets may be attached, are available. It is therefore an object of our invention to provide a sealed flexible joint for connecting the adjoining ends of two tubes used to convey fluid under pressure which will permit axial, lateral and angular displacement of the tube ends and which will counteract the thrust of the pressurized fluid against the interior of the tubes to prevent movement of the tube sections away from each other due to such thrust.

Another object is to provide a flexible joint which will permit axial, lateral and angular displacement of the tube ends while maintaining an effective seal against leakage.

A further object is to provide a sealed flexible joint as above mentioned which is of light weight and of relatively simple and inexpensive construction.

These and other objects and advantages will become apparent as the description of the invention proceeds.

For a better understanding of the invention reference is made to the accompanying drawing illustrating a preferred embodiment thereof in which:

Fig. 1 is a longitudinal view of the flexible joint with a portion thereof cut away to show its construction;

Fig. 2 is a schematic drawing of a tubing system illustrating a typical installation of the flexible joint;

Fig. 3 is an enlarged view of a portion of the ball and socket shown in Fig. 1 and Fig. 4 is an enlarged view of the end of a sealing ring shown in Fig. 1.

The sealed flexible joint is shown in Fig. 1 connecting a cylindrical metal tube 10 with a cylindrical metal tube 11. The joint comprises a first ball and socket joint 12 connected with a second ball and socket joint 12' of the same general consturction and whose corresponding parts are designated by the same reference numerals primed, by a sealed slip joint 13. Ball and socket joint 12 comprises an annular socket 14 having one end 15 hermetically secured as by welding to the end 16 of a connecting member 17 the outer end of which terminates in a flange 18 adapted to engage and be secured to a mating flange 19 on tube 10 by means of a clamp 20. An annular ball member 21 positioned in socket 14 has its end 22 turned outwardly to slidably engage the inner surface 23 of socket 14. A resilient metallic ring 24 having one end 25 secured to the inner surface 26 of member 17 and its other end 27 pressing against the inner surface 28 of ball 21 holds end 22 of ball 21 in engagement with inner surface 23 of socket 14. Ball 21 has a projecting cylindrical portion 29 extending from it, the diameter of which is slightly larger than the diameter of tubes 10 and 11. A straight cylindrical tube 30 having a diameter substantially equal to the diameter of tubes 10 and 11 has one end 31 hermetically secured to inner surface 32 of projecting portion 29. Tube 30 passes through projecting cylindrical portion 29' with its outer surface 33 in sliding engagement with inner surface 32' of portion 29' and its end 34 projecting into the interior of ball and socket joint 12' to provide a slip joint connection 13 between ball and socket joints 12 and 12'.

Fig. 2 of the drawing illustrates a typical installation of the sealed flexible joint in a tubing system for conveying pressurized air. End 35 of tube 10 is connected to a source of pressurized air such as an air compressor in a turbo-jet engine (not shown) and end 37 of tube 11 is connected to a fixed object 38 such as an air powered turbine. The pressurized air within tubes 10 and 11 exerts considerable thrust against their inner surfaces which tends to urge tubes 10 and 11 outwardly away from each other in the direction indicated by the arrows. When a conventional slip joint is used in connecting tubes 10 and 11 this outward movement must be controlled to prevent connected ends 35 and 37 from being subjected to a severe bending strain and also to prevent the overlapping ends of the slip joint from becoming disengaged. As before stated it has been customary to control the movement of the tubes by the use of heavy brackets and supports which may be eliminated by the use of the sealing means forming a part of the subject invention and which is hereinafter described.

Referring again to Fig. 1, the means for sealing slip joint 13 comprises a cylindrical sleeve 39 concentrically surrounding tube 30 and having one end 40 hermetically secured to cylindrical portion 29'. Sleeve 39 is spaced away from tube 30 a sufficient distance so that the transverse sectional area of the space between sleeve 39 and tube 30 is equal to the transverse sectional area of tube 30. An annular support 41 having one end 42 secured to the inner surface 43 of sleeve 39 adjacent its outer end 44 and its other end 45 in sliding engagement with outer surface 33 of tube 30, supports end 44 of sleeve 39. A metallic sealing ring 46 has one end 47 hermetically secured to the inner surface 43 of sleeve 39 and its other end 48 slidably engaged in sealing contact with outer surface 33 of tube 30. A second metallic sealing ring 49 has one end 50 hermetically secured to outer surface 33 of tube 30 and its other end 51 slidably engaged in sealing contact with inner surface 43 of sleeve 39. A third metallic sealing ring 52 has one end 53 hermetically secured to inner surface 43 of sleeve 39 and its other end 54 slidably engaged in sealing contact with outer surface 33 of tube 30. Ends 42 and 47 of annular support 41 and ring 46 respectively may be secured to inner surface 43 in overlapping positions as shown in Fig. 1 to provide a more compact structure.

To obtain a positive sealing contact between ends 48 and 54 of rings 46 and 52 and outer surface 33 of tube 30, rings 46 and 52 are provided with inside diameters which are slightly smaller than the outside diameter of tube 30. The ends 48 and 54 are thinned as shown in Fig. 4 to impart a resilient flexibility to these portions of the rings and are inclined to permit engagement with surface 33 at a small acute angle. When the flexible joint is assembled ends 48 and 54 are deflected outwardly an amount sufficient to permit tube 30 to pass through them, the resiliency of the thinned ends causing them to press in sealing contact against surface 33. To obtain positive sealing contact between end 51 of ring 49 and surface 43 of sleeve 39, ring 49 is provided with an outside diameter which is slightly larger than the inside diameter of sleeve 39. End 51 is thinned in the same manner as ends 48 and 54 of rings 46 and 52 and is deflected inwardly sufficiently to permit sleeve 39 to pass around it, the resiliency of thinned end 51 causing it to press outwardly in sealing contact against surface 43. It has been found that if rings 46, 49 and 52 are of such size that the sealing edges are deflected approximately .002 inch, a satisfactory seal is obtained without sufficient increase in friction to interfere with the movement of the various parts of the joint. Sealing rings 46, 49 and 52 are preferably made of a rigid corrosion-resistant metal of approximately .050 inch thickness and shaped as shown in Fig. 1 with ends 48, 51 and 54 being thinned to approximately .005 inch in thickness. Annular support 41 is preferably made of a rigid corrosion-resistant metal shaped as shown in Fig. 1 with its end 45 in close sliding engagement with surface 33 to prevent any angular movement of end 44 of sleeve 39.

The portion of tube 30 extending through sleeve 39 is provided with a series of spaced apart openings 55 which connect the interior of tube 30 with the area 56 between sealing ring 46 and sealing ring 49. Sleeve 39 is provided with a series of spaced apart openings 57 connecting the area 58 between sealing rings 49 and 52 with the atmosphere. When pressurized air is introduced into the tubing system in the direction indicated by the arrow some of it passes from the interior of tube 30 through openings 55 into area 56. The pressurized air pressing against face 59 of ring 46 exerts a thrust against ring 46 which is transmitted to sleeve 39 through end 47 which is attached thereto. Sleeve 39 transmits the thrust to cylindrical portion 29' through its end 40 secure thereto drawing ball and socket joint 12' and tube 11 toward tube 10. The pressurized air in area 56 pressing against face 60 of ring 49 exerts a thrust against ring 49 which is transmitted to tube 30 through end 50 secured thereto. Tube 30 transmits the thrust to cylindrical portion 29 through its end 31 secured thereto drawing ball and socket joint 12 and tube 10 toward tube 11. The sectional area of the space between sleeve 39 and tube 30 being substantially equal to the transverse sectional area of tube 30, the thrust of the pressurized air against rings 46 and 49 drawing tubes 10 and 11 together is sufficient to counteract the thrust of the pressurized air within tubes 10 and 11 forcing them apart. The forces exerted on each of tubes 10 and 11 are thus balanced so that neither tube 10 or 11 is moved in any direction by them. Area 58 between rings 49 and 52 is vented to the atmosphere to prevent any accumulation of air in this area due to possible leakage of air past sealing ring 52, which would counteract the thrust of pressurized air against face 60 of ring 49.

The flexible joint illustrated in Fig. 1 is constructed in such a manner that excesive angular and axial displacement of tubes 10 and 11 will not cause the various parts of the joint to become disengaged or damaged. The angular movement of each ball and socket joint is limited by the distance between end 22 of ball 21 and end 16 of member 17. Excessive angular displacement of tubes 10 and 11 will cause end 22 of ball 21 to abut against end 16 of member 17 to prevent any further movement which might cause ball 21 to become disengaged from socket 14 or cause damage to either of these parts. Axial movement of tubes 10 and 11 which causes ball and socket joints 12 and 12' to move away from each other, is limited by a retaining ring 61 secured to outer surface 33 of tube 30 at its end 34. Ball and socket joints 12 and 12' are permitted to move away from each other until ring 61 abuts against inner surface 28' of ball 21' to prevent end 34 of tube 30 from being withdrawn from within ball and socket 12'. Axial movement of tubes 10 and 11 which causes ball and socket joints 12 and 12' to move toward each other is limited by the distance between end 62 of cylindrical portion 29 and end 45 of annular support 41. Ball and socket joints 12 and 12' are permitted to move toward each other until end 62 abuts against end 45 to stop any further movement in this direction prior to end 34 of tube 30 coming into contact with inner surface 26' of member 17'.

The surfaces of the various parts of the flexible joint which are in sliding contact with each other, are treated with a known type anti-galling preparation to form a thin coating which assures continued freedom of movement for the parts.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what we claim as new and useful and desire to secure by Letters Patent is:

1. Means for sealing a slip joint between an inner cylindrical metal tube and an outer cylindrical metal tube having sliding contact with said inner tube, comprising: a metal sleeve having one end hermetically secured to the end of the outer tube and having a cylindrical body portion concentrically surrounding said inner tube and spaced apart therefrom; an annular support having one end hermetically secured to the body portion of said sleeve at its upstream end and the other end of said support extending radially inward to slidably engage the outer surface of said inner tube; a first metallic sealing ring having one end hermetically secured to said body portion adjacent said support, its other end being tapered and extending radially inward to slidably engage the outer surface of said inner tube in sealing contact, said tapered end being inclined at a small acute angle to said surface; a second metallic sealing ring disposed downstream from said first ring and having one end hermetically secured to the outer surface of said inner tube, its second end being tapered and extending radially outward to slidably engage the inner surface of said body portion in sealing contact, said second end being inclined at a small acute angle to said surface; a third metallic ring disposed downstream from said second ring and having one end hermetically secured to said body portion and a downstream end tapered and extending radially inward to slidably engage the outer surface of said inner tube in sealing contact, said downstream end being inclined at a small acute angle to said surface.

2. Sealing means as claimed in claim 1; in which said metallic sealing rings are composed of relatively rigid sheet metal having tapered ends of greatly reduced thickness causing said ends to be resiliently flexible.

3. Sealing means as claimed in claim 2; in which said sealing rings are positioned substantially parallel to each other at an angle substantially less than 90° to the axis of said tubes and are of such size that the tapered ends thereof are deflected a small amount by the surfaces with which they are slidably engaged causing said ends to press resiliently against said surfaces in metal to metal sealing contact.

4. A longitudinally expansible tube assembly for conducting hot gases comprising an inner substantially cylindrical metal tube; an outer metal tube surrounding said inner tube and means supporting said outer tube concentric with said inner tube while maintaining a sealed joint between the tubes, said supporting means comprising a first metal sealing ring having a short cylindrical portion welded to the inner face of said outer tube at the upstream end thereof, said sealing ring having an inwardly extending portion inclined in a downstream direction and whose inner end is tapered and inclined at a small acute angle to the outer surface of the inner tube against which surface said inner end presses to maintain sealing contact; a second metal ring having a short cylindrical portion welded to the inner face of the short cylindrical portion of said sealing ring, said second ring having a radially extending portion whose inner end is bent to provide a terminal portion extending upstream and having sliding contact with the outer surface of said inner tube; said outer tube at its downstream end having an inwardly sloping annular portion disposed at an acute angle to the axis of said inner tube, said annular portion at its downstream end having an integral cylindrical sleeve spaced from the outer surface of said inner tube; and a ring attached to said sleeve and extending inwardly therefrom to engage and have sliding contact with the outer surface of said inner tube.

5. A flexible duct adapted to convey gas at a pressure substantially above atmospheric, comprising in combination: a first ball and socket joint; a long cylindrical tube hermetically connected to the small end of the ball member; a second ball and socket joint; a second tube having a cylindrical portion of substantially greater diameter than the diameter of said cylindrical tube concentrically surrounding said cylindrical tube and an inwardly tapered end portion hermetically connected to the small end of said second ball member; an annular support having one end hermetically connected to the cylindrical portion of said second tube and its other end extending radially inwardly to slidably engage the outside surface of said cylindrical tube; a first metallic ring having one end hermetically secured to the cylindrical portion of said second tube and its other end extending radially inward to slidably engage the surface of said cylindrical tube to form a slip joint therewith; a second metallic ring having one end hermetically secured to said cylindrical tube and its other end extending radially outward to slidably engage the inner surface of the cylindrical portion of said second tube to form a slip joint therewith; and a third metallic ring having one end hermetically secured to the cylindrical portion of said second tube and its other end extending radially inward to slidably engage the surface of said cylindrical tube to form a slip joint therewith, said cylindrical tube having one or more openings adapted to pass pressurized gas from within said tube into the area between said first and second metallic rings.

References Cited in the file of this patent

UNITED STATES PATENTS

| | | |
|---|---|---|
| 2,373,280 | Weber | Apr. 10, 1945 |
| 2,493,404 | Haynes | Jan. 3, 1950 |
| 2,616,728 | Pitt | Nov. 4, 1952 |

FOREIGN PATENTS

| | | |
|---|---|---|
| 379,896 | France | Sept. 21, 1907 |